US007150035B2

(12) United States Patent
Makofka et al.

(10) Patent No.: US 7,150,035 B2
(45) Date of Patent: Dec. 12, 2006

(54) PATH SEALED SOFTWARE OBJECT CONDITIONAL ACCESS CONTROL

(75) Inventors: Douglas Makofka, Willow Grove, PA (US); Eric Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 977 days.

(21) Appl. No.: 09/813,769

(22) Filed: Mar. 20, 2001

(65) Prior Publication Data

US 2002/0138756 A1  Sep. 26, 2002

(51) Int. Cl.
*G06F 17/00* (2006.01)
(52) U.S. Cl. .................. 726/3; 726/6; 726/12
(58) Field of Classification Search ........ 713/150–158, 713/200–202, 189; 726/3, 6, 12
See application file for complete search history.

(56) References Cited

U.S. PATENT DOCUMENTS 5,847,751 A  12/1998  Safadi
6,301,662 B1  10/2001  Hardjono

FOREIGN PATENT DOCUMENTS

WO  WO 01/16673 A1  3/2001

OTHER PUBLICATIONS

Packet level access control scheme for internetwork security; lqbal, M.S.; Poon, F.S.F.; Communications, Speech and Vision, IEE Proceedings I vol. 139, Issue 2, Apr. 1992 p.(s):165-175.*
Decentralized Authentication Mechanisms for Object-based Storage Devices; Kher, V.; Yongdae Kim; Security in Storage Workshop, 2003. SISW '03. Proceedings of the Second IEEE International; Oct. 31, 2003 p. (s):1-1.*
On inter-realm authentication in large distributed systems; Gilgor, V.D.; Luan, S.-W.; Pato, J.N.; Research in Security and Privacy, 1992. Proceedings., 1992 IEEE Computer Society Symposium on May 4-6, 1992 p.(s): 2-17.*
Zhou, Lidong, et al., "Securing Ad Hoc Networks," IEEE Network, Nov./Dec. 1999, pp. 24-30.
Sirois, Karen, et al., "Securing the Nimrod Routing Architecture," IEEE, 1997, pp. 74-84.
Murphy, S.L., et al., "Digital Signature Protection of the OSPF Routing Protocol," Proceedings of SNDSS, IEEE, 1996, pp. 93-102.

* cited by examiner

*Primary Examiner*—David Jung
(74) *Attorney, Agent, or Firm*—Robert P. Marley

(57) ABSTRACT

A method of securing information. The method comprises: obtaining a path to the information; and performing a security check regarding the path.

26 Claims, 5 Drawing Sheets

PATH SEALED SOFTWARE OBJECT CONDITIONAL ACCESS CONTROL

CROSS-REFERENCES TO RELATED APPLICATIONS

This invention is related to (U.S. patent application Ser. No. 09/651,742, filed Aug. 30, 2000 and entitled "Resource Access Control System") (hereinafter "Meandzija I"), the disclosure of which is incorporated herein by reference for all purposes. This invention is related to (U.S. patent application Ser. No. 09/580,303, filed May 26, 2000 and entitled "Object and Resource Security System") (hereinafter "Sprunk I"), the disclosure of which is incorporated herein by reference for all purposes.

FIELD OF THE INVENTION

The present invention relates to secure access systems in general, and more particularly to securing a path to information on the Internet.

BACKGROUND OF THE INVENTION

Cable television (TV) providers distribute video streams to subscribers by way of conditional access (CA) systems. CA systems distribute video streams from a headend of the cable TV provider to a set-top box (STB) associated with a subscriber. The headend includes hardware that receives the video streams and distributes them to the STB's within the CA system. Select STB's are allowed to decode certain video streams according to entitlement information sent by the cable TV provider to the STB. In a similar way, other video program providers use satellite dishes to wirelessly distribute video content to STB's.

Video programs are broadcast to all STB's, but only a subset of those boxes is given access to specific video programs. For example, only those that have ordered a pay-per-view boxing match are allowed to view it even though every STB may receive encrypted data stream for the match. Once a user orders the pay per view program, an entitlement message is broadcast in encrypted form to all STB's. Only the particular STB for which the entitlement message is intended can decrypt it. Inside the decrypted entitlement message is a key that will decrypt the pay per view program. With that key, the STB decrypts the pay-per-view program as it is received in real-time. Some systems sign entitlement messages.

Only recently has storage of multiple hours of video become practical. Each video program is transmitted to STB's as a compressed MPEG2 data stream. One hour of video corresponds to about one gigabyte of compressed data. Since multi-gigabyte storage is common today, multiple hours of video can now be stored. In contrast, conventional CA systems presume content is ephemeral and cannot be stored. In other words, conventional systems are designed presuming that the video programs were too large to retain them for any period of time. As those skilled in the art can appreciate, the ability to store multi-gigabyte video programs spawns a need for additional security measures in CA systems.

Some systems integrate personal computing with a TV to display content. Products such as WebTV™ integrate web browsing and E-mail features with a TV. In other systems, a personal computer (PC) is connected to an Internet service provider (ISP) that provides the content for the web browsing and E-mail features. Software programs, such as the E-mail program, tend to be small and easily stored. Those skilled in the art recognize that these PC's do not provide adequate security and are thus susceptible to viruses and hackers.

As described above, conventional CA systems only check entitlement of video streams. With the advent of larger storage and smaller Internet related programs, content can be stored and reside with the user for an indefinite period of time. To maintain control over this content, additional security measures are needed.

Therefore, security techniques have been developed that assure the security of objects and resources. Security checks can made at various times during the handling of the object or resource.

SUMMARY OF THE INVENTION

In an embodiment of a method according to the present invention, information is secured. The method comprises: obtaining a path to the information; and performing a security check regarding the path.

In an embodiment of a system according to the present invention, information is secured. The system comprises: means for obtaining a path to the information; and means for performing a security check regarding the path.

In an embodiment of an apparatus according to the present invention, information is secured on a network. The apparatus comprises: a processor coupled with the network; instructions, operable on by the processor, for obtaining a path to the information; and instructions, operable on by the processor, for performing a security check regarding the path.

In an embodiment of an apparatus according to the present invention, information is secured on a network. The apparatus comprises: a processor coupled with the network; wherein the processor is operable on instructions for obtaining a path to the information; and the processor is operable on instructions for performing a security check regarding the path.

In an embodiment of a computer-readable media according to the present invention, information is secured. The computer-readable media comprises: instructions for obtaining a path to the information; and instructions for performing a security check regarding the path.

In an embodiment of a signal according to the present invention, the signal is embodied in a carrier wave and generated by a method of securing information. The method comprises: obtaining a path to the information; and performing a security check regarding the path.

In an embodiment of a system according to the present invention, information is secured. The system comprises: a server configured to provide the information; a path sealer coupled with the server, the path sealer configured to convey at least one entitlement criterion to an end user and configured to convey the information to an end user; and an access controller coupled with the path sealer, the access controller configured to convey at least one entitlement criterion to the path sealer and configured to convey at least one entitlement permission to an end user.

A further understanding of the nature and the advantages of the present inventions disclosed herein may be realized by reference to the remaining portions of the specification and the attached drawings.

DESCRIPTION OF THE SPECIFIC EMBODIMENTS

Figure 1:
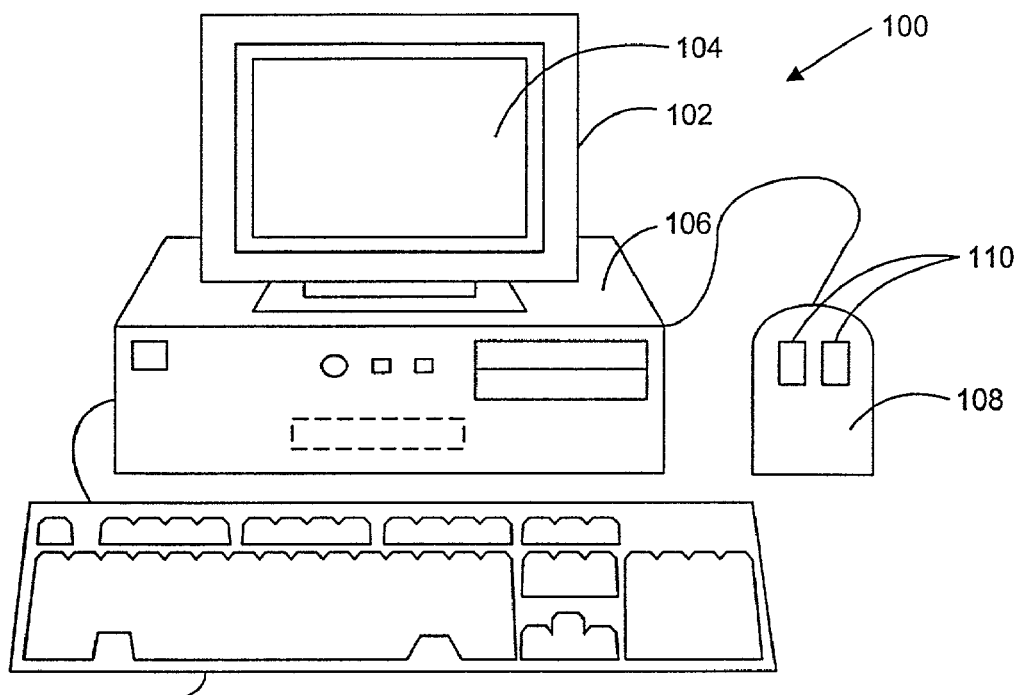
FIG. 1 is an illustration of a computer system suitable for use with the present invention.

As shown in the exemplary drawings wherein like reference numerals indicate like or corresponding elements among the figures, an embodiment of a system according to the present invention will now be described in detail. The description describes an exemplary apparatus suitable to implement an embodiment of the present invention. Methods of operation and associated user interface details in accordance with the invention are also provided.

FIG. 1 shows a computer system 100 suitable for use to provide a system in accordance with the present invention. The computer system 100 includes a display 102 having a display screen 104. A cabinet 106 houses standard computer components (not shown) such as a disk drive, CD-ROM drive, display adapter, network card, random access memory (RAM), central processing unit (CPU) and other components, subsystems and devices. User input devices such as a mouse 108 having buttons 110, and a keyboard 112 are shown. Other user input devices such as a trackball, touch-screen, digitizing tablet, etc., can be used. In general, the computer system 100 is illustrative of one type of computer system, such as a desktop computer, suitable for use with the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Figure 2:
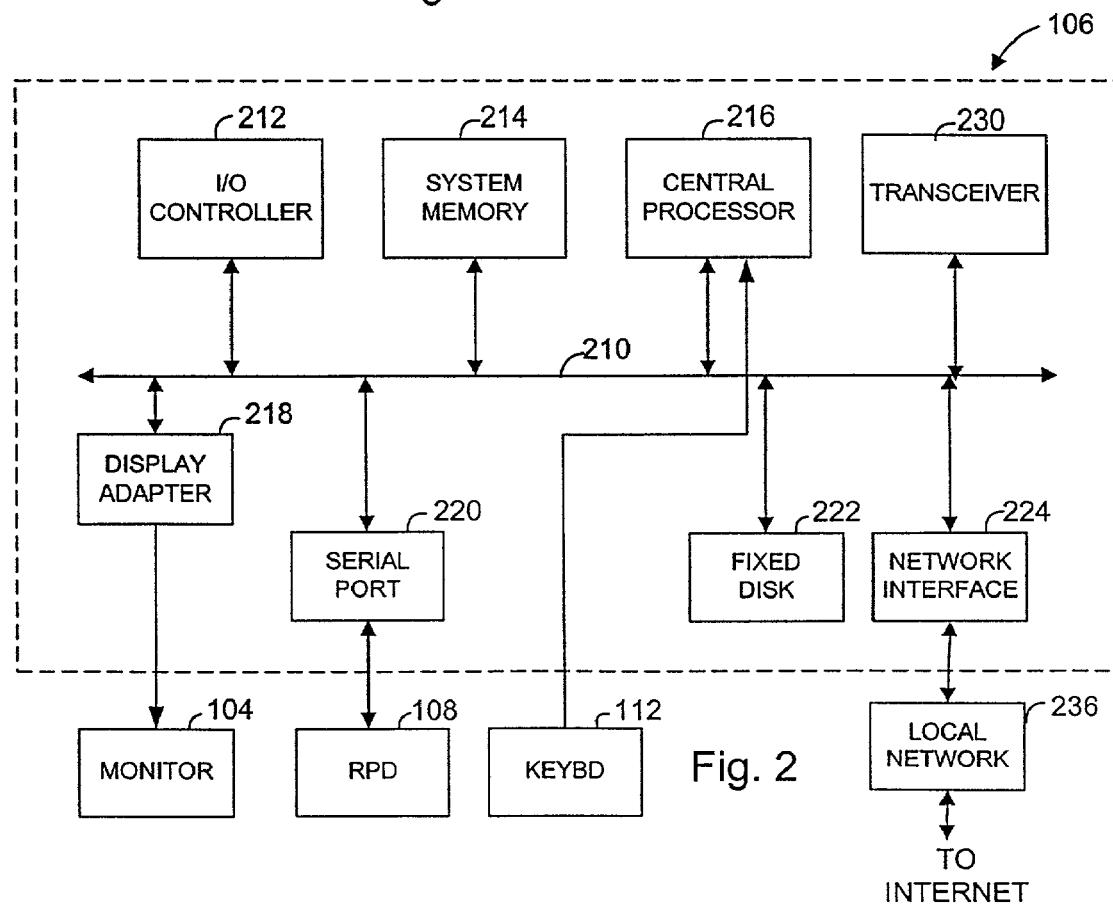
FIG. 2 shows subsystems in the computer system of FIG. 1.

FIG. 2 illustrates subsystems found in the computer system 100. Subsystems within box 106 are directly interfaced to an internal bus 210. The subsystems include input/output (I/O) controller 212, system random access memory (RAM) 214, central processing unit (CPU) 216, display adapter 218, serial port 220, fixed disk 222, network interface adapter 224 and transceiver 230. The use of the bus allows each of the subsystems to transfer data among the subsystems and, most importantly, with the CPU. External devices can communicate with the CPU or other subsystems via the bus by interfacing with a subsystem on the bus. The monitor 104 connects to the bus through the display adapter 218. A relative pointing device (RPD) such as a mouse 108 connects through the serial port. Some devices such as keyboard 112 can communicate with the CPU by direct means without using the main data bus as, for example, via an interrupt controller and associated registers (not shown). The transceiver 230 can be coupled with a satellite system, cable system, telephone lines or any other system suitable for propagating information. The transceiver can include or be coupled with a communication interface, which can be coupled with bus 210.

FIG. 2 is illustrative of one suitable configuration for providing a system in accordance with the present invention. Subsystems, components or devices other than those shown in FIG. 2 can be added without deviating from the scope of the invention. A suitable computer system can also be achieved without using all of the subsystems shown in FIG. 2. Other subsystems such as a CD-ROM drive, graphics accelerator, etc., can be included in the configuration without affecting the performance of the system included in the present invention.

The invention is related to the use of apparatus, such as the computer system 100, for implementing a scalable pay-by-time technique for the secure multicast distribution of streaming content, including, but not limited to, video and audio. According to one embodiment of the invention, multicast distribution is provided by the computer system 100 in response to the processor 216 executing one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, non-volatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 216 for execution. For example, the instructions may initially be borne on a magnetic disk of a remote computer. The remote computer can load the instructions into its dynamic memory and send the instructions over a telephone line using a modem. A modem local to the computer system 100 can receive the data on the telephone line and use an infrared transmitter to convert the data to an infrared signal. An infrared detector coupled with the bus 210 can receive the data carried in the infrared signal and place the data on the bus. The bus carries the data to the memory 214, from which the processor retrieves and executes the instructions. The instructions received by the memory can optionally be stored on the fixed disk 222 either before or after execution by the processor.

The computer system 100 also includes a network interface 224 or communication interface coupled to the bus 210. The network interface or communication interface provides a two-way data communication coupling with a network link 234 that is connected to a local network 236. For example, the network interface or communication interface can be an integrated services digital network (ISDN) card or a modem to provide a data communication connection to a corresponding type of telephone line. As another example, the network interface or communication interface can be a local area network (LAN) card to provide a data communication connection to a compatible LAN. Wireless links can also be implemented. In any such implementation, the network interface 224 or the communication interface and transceiver 230) send and receives electrical, electromagnetic or optical signals that carry digital data streams representing various types of information.

The network link 234 typically provides data communication through one or more networks to other data devices. For example, the network link can provide a connection through the local network 236 to a host computer or to data equipment operated by an Internet Service Provider (ISP). The ISP in turn provides data communication services through the worldwide packet data communication network, now commonly referred to as the "Internet." The local network and the Internet both use electrical, electromagnetic or optical signals that carry digital data streams. The signals that propagate through the various networks and the signals on the network link and that propagate through the network interface 224, and the signals that propagate through the transceiver 230, which carry the digital data to and from computer system 100, are exemplary forms of carrier waves transporting the information.

The computer system 100 can send messages and receive data, including user commands, video data, audio data and program codes through the network(s), the network link 234, and the network interface 224. In the Internet example, a server might transmit a requested code for an application program through the ISP, Internet, local network 236 and network interface 224. Instead of or in addition to transmission via the Internet, the computer system 100 can send and receive data via the transceiver 230 and a wireless system, satellite system, cable system, telephone lines or any other system suitable for propagating information between the computer system and an information distribution system. In accordance with the invention, one such downloaded application provides for a scalable pay-by-time technique for secure multicast distribution of streaming content as described herein. The processor 216 can execute the received code as the code is received, and/or store the code on the fixed disk 222, or other non-volatile storage for later execution. In this manner, the computer system can obtain an application code in the form of a carrier wave.

It is contemplated that various hardware components can be added to the present system. Some examples of these components include STB's, interactive televisions, mobile devices, etc.

As mentioned above, security techniques exist for objects and resources. While the security techniques mentioned above work for typical objects and resources, if one tries to apply the techniques to HTML and XML that come off an Internet browser then problems develop. The data required to secure the child processes frequently becomes larger than the child processes themselves.

In accordance with embodiments of the present invention, a technique is envisioned for the security/access control of material delivered in a client/server environment. More specifically, a technique is envisioned for the authentication and access control of information (software and/or data) entering an STB or other device based on the source of the information.

Information on web servers changes quickly. Consequently, it is not practical to require that the information be pre-processed for authentication and authorization. Therefore, what is desired is to be able to "bless" certain servers as being authentic and certain users as being authorized for access, and to accept any information from these servers.

Frequently, to implement this technique, each device in the network that handles the information to be transferred in an authenticatable fashion is required to perform a secure hash over the path of the information. It is also contemplated that the path can be checked directly. This may be part of the normal protocol being used, or may be an addition to the protocol being used. Each device transferring information in an authenticatable fashion would check the hash of all sources (paths) to ensure that no tampering with the message has occurred. Then, the path is checked against a tree (or table or other data structure) containing authentic paths. Further transferal of the information would only occur if the path into said device was authenticated (i.e., its hash checked successfully).

These features can be built into the hubs, switches, routers, multiplexers, etc., that transfer the information. The client device that uses the material can verify that the path was delivered securely (by checking the overall hash), and that the path itself is a valid path for authenticated and access controlled material (potentially by a lookup over a routing tree describing valid routes between the client and the server).

Access control can be applied to each path in the routing tree, such that a client can be granted or denied access to information from various sources based on the resource access rights granted by the access control system.

These techniques can be used in a walled-garden web environment where certain qualities of the information need to be certified by the network provider. These qualities may include the content itself, the source of the content, the business relationship between the content provider and the network provider, etc. These qualities are primarily enforced by controlling the servers that host the content. This technique is of general use in any client/server environment where authentication of the source of the material is required.

Figure 3:
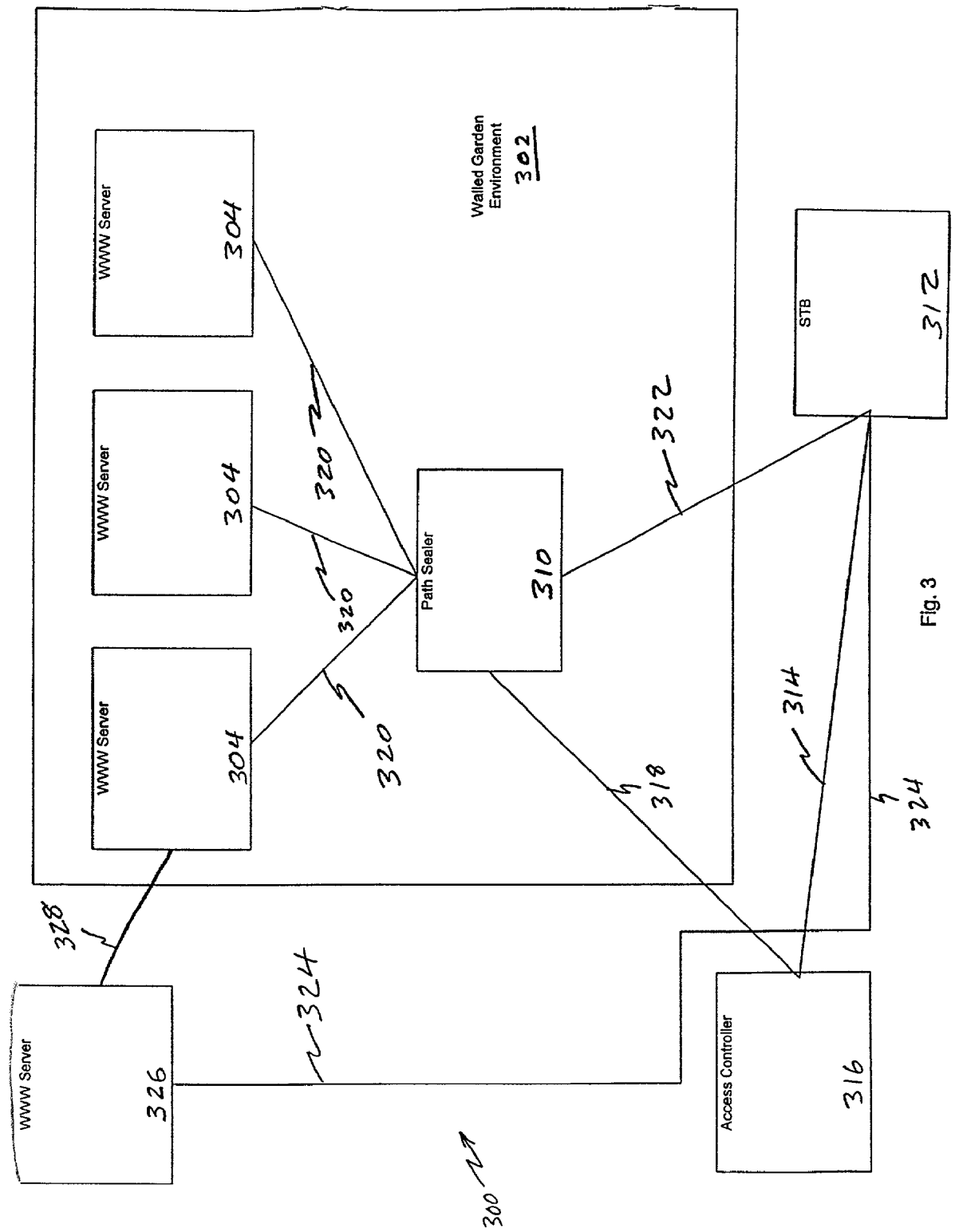
FIG. 3 depicts an exemplary system according to embodiments of the present invention.

More specifically, FIG. 3 depicts an exemplary system 300 according to embodiments of the present invention. The system is modeled on a walled garden environment 302 in the embodiment shown. In the walled garden model, certain world wide web (WWW) servers 304, 306, 308 are given preferential (or sole) privileges in the system. Although three WWW servers 304, 306, 308 are depicted in the walled garden environment, more or fewer servers may be present. A path sealer 310 is coupled between the WWW servers 304, 306, 308 and an STB 312, or other computer system platform. In an alternate embodiment, the path sealer can be built into the WWW servers 304, 306, 308.

Connection 314 is used to convey entitlement information (EI) from the access controller 316 to the STB 312. This EI may be a tier. The EI is used to provide access control to the WWW servers 304, 306, 308 in the walled garden environment 302. This EI is typically referred to as an entitlement management message (EMM). Furthermore, information about what entitlements must be held to access a specific server is also sent. These messages are called entitlement control messages (ECM's).

Connection 318 is used to associate specific entitlement criteria (a tier for example), with a WWW server or set of servers. It is contemplated that this link may be automated or manual.

Connection 320 is a standard communications channel (e.g., Ethernet). The WWW server 304, 306, 308 uses this channel as if it was connected to any communications equipment (e.g., an Ethernet hub). The path sealer 310 performs a secure hash over the packets received over connection 320, adds the hash to the packets with the appropriate EI (as determined by the information provided via connection 318) and forwards the packets to the STB 312 via connection 322.

Connection 324 defines a path from the WWW server 326 to the STB 312 that is outside the walled garden 302 and therefore not through the path sealer 310. Whether or not the STB can access the information that is transmitted via the connection 324 is dependent upon the entitlement permissions delivered via the connection 314. Furthermore, the functions that the STB 312 is allowed to perform on this information (e.g., view text, render image, execute JavaScript, etc.) is also dependent upon the entitlement permissions delivered via the connection 314.

Connection 328 (possibly a hyperlink) couples a WWW server 304 inside the walled garden environment 302 with a WWW server 326 outside the walled garden environment. Whether this type of connection is allowed, or if allowed, how it is processed by the path sealer 310 is up to the operator of the system. The path sealer can choose not to seal this path (connection 328), or to seal the path with a different set of entitlements than the path sealer uses to seal the servers within the walled garden environment.

Figure 4:
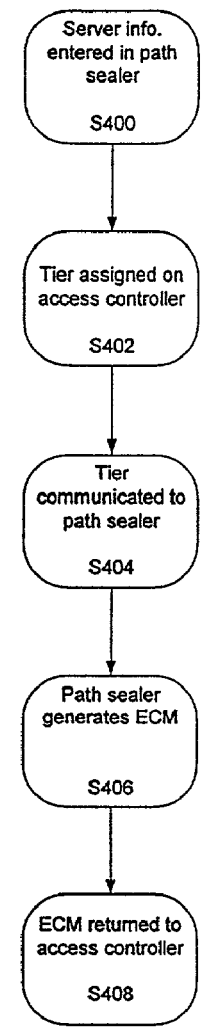
FIG. 4 is a flow diagram illustrating how a server becomes path-sealed.

Referring to FIG. 4, a WWW server becomes path-sealed as follows. At step S400, the IP address and possibly other routing information including MAC addresses of the new server and any intermediary equipment for the new server is entered in the path sealer. This server is now known to the path sealer.

At step S402, a tier is assigned on the access controller 316 to manage the access control rights to the information on the new server. For example, the tier may be "http://www-.weather.united_states/western_united_states/california."

At step S404, the tier is communicated to the path sealer 310 via the connection 318. At step S406, the path sealer generates an ECM containing the address of the server, the tier associated with the server and a digital signature. The ECM indicates that to grant path-sealed privileges to the material coming from the server whose address is contained in the ECM, the tier indicated in the ECM must be authorized in the client. In other words, the client (user) must be authorized to access tier "http://www.weather.united_states/western_united_states/california." This authorization is communicated in the EMM. This message is sent from the access controller 316 to the client via a separate transaction.

At step S408, the ECM for the new server is returned to the access controller 316 via connection 318 to deliver information as needed to the client (through the STB 312) via connection 314. This message may be carouselled on a periodic basis by the access controller. The ECM could also be sent by a path sealing device that acts as a TCP proxy for the actual server via the connection 322.

Figure 5:
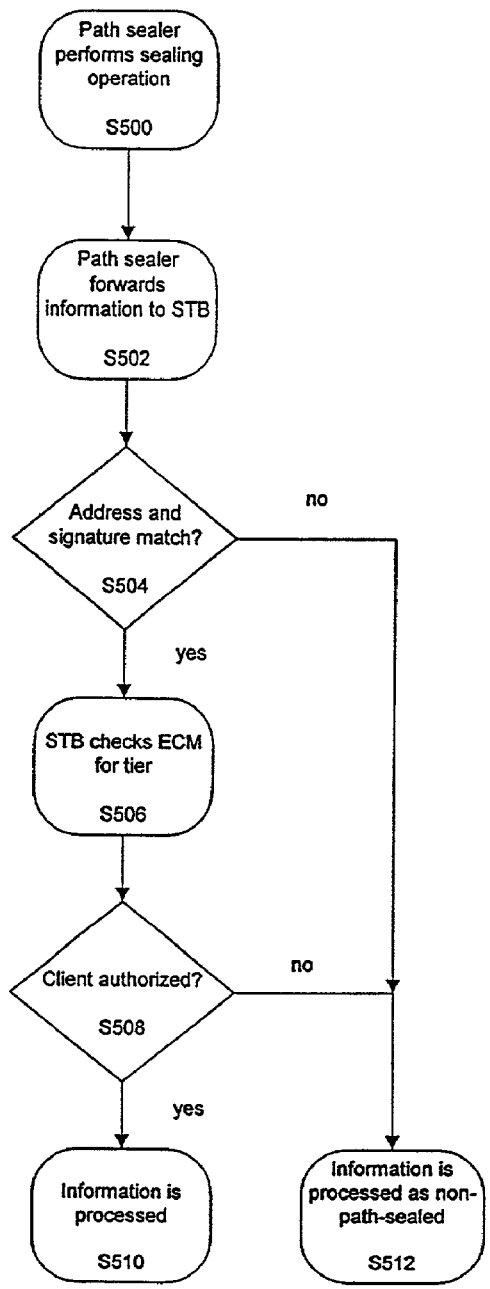
FIG. 5 is a flow diagram illustrating how a server becomes path-sealed in a walled garden environment.

Turning now to FIG. 5, a WWW server 304 becomes path-sealed in a walled garden environment 302 as follows. All communications from walled-garden WWW servers 304 to the network where the STB 312, the access controller 316, other WWW servers 326 and the like reside, occur through the path sealer 310. The WWW server 304 uses the connection 320 to the path sealer 310 to send information to the client via the STB.

At step S500, the path sealer 310 performs the sealing operation on information received via the connection 320. There are several algorithms that may be used in the sealing operation, as well as checks to assure that the messages being sealed come from the appropriate server. The path sealer uses the information acquired in step S400 to ascertain that the message received via the connection 320 indeed came from a path-sealed server. The sealing operation includes adding a digital signature to the message before forwarding it to the client device. Then, at step S502, the path sealer 310 forwards the information to the client (through the STB 312, in one example) via the connection 322.

At step S504, when the client device, such as the STB 312 or another suitable device, receives the path-sealed message (information) it checks the digital signature to assure that the address has not been modified (i.e., checks for authentication of the message). If the address and the signature match, then at step S506 the STB 312 checks the ECM that matches the address to see which tier is associated with the address. At step S508, the tier is then checked to see if the client has authorization for the address. If the client does have authorization, the information is processed at step S510. If the client does not have authorization, the information is discarded at step S512, or processed as a non-path-sealed message.

A WWW server 326 that is outside a particular walled garden environment 302 becomes path-sealed through the walled garden environment in almost the same manner as shown and described with reference to FIG. 5. The only difference is that the path sealer 310 sees that the connection 328 is the original source of the information that is presented to the path sealer via the connection 320. In this case, the path sealer uses a separate set of authorization criteria (a separate ECM) to control access by the client to the information. In one embodiment according to the present invention, the path sealer will not forward the message to the STB 312 as well.

Figure 6:
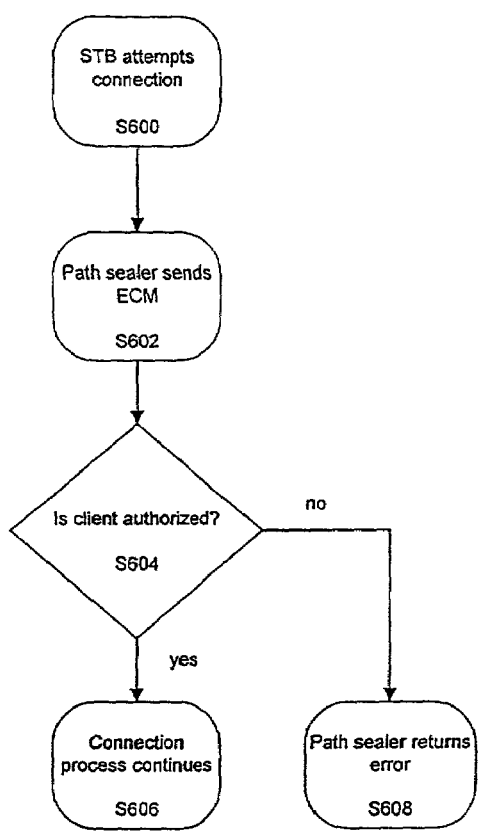
FIG. 6 is a flow diagram illustrating how a path sealer can act as a TCP proxy for a server.

Referring to FIG. 6, the path sealer 310 can act as a TCP proxy for the server in question as follows. At step S600, the client device (such as the STB 312) attempts to establish a TCP connection with the server (via the connection 322). At step S602, the path sealer sees this request and sends the ECM that contains the entitlement requirements for the server (as described with reference to FIG. 4). At step S604, if the client has the entitlements and is therefore authorized, the connection process continues at step S606. Otherwise, at step S608, the path sealer returns an error to the application requesting the connection.

Notice that this technique has a dependence on the software in the client performing the tier check. If this software has been compromised (say by a virus), the client could continue with the connection even if the tier check was not successful. This technique should therefore be combined with some method of the client software authenticating itself.

It should be noted that the various connections can be wire connections, wireless connections, hyperlinks, etc. It should also be noted that the concepts in Meandzija I and Sprunk I can be applied to methods and apparatus according to the present invention.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of securing information, the method comprising:
   obtaining said information at a path sealer;
   obtaining a path to the source of said information; and
   performing a security check regarding the path to said source of said information so as to confirm that no tampering with said information has occurred between said source and said path sealer.

2. The method of claim 1, wherein performing a security check comprises performing an authentication check on the path.

3. The method of claim 1, wherein performing a security check comprises performing an authorization check on a user attempting to access the path.

4. The method of claim 1, wherein performing a security check comprises performing an authentication check on the path and performing an authorization check on a user attempting to access the path.

5. A system for securing information, the system comprising:
   means for obtaining a path to the source of said information;
   a path sealer for receiving said information;
   means for performing a security check regarding the path to said source of said information, so as to confirm that no tampering with said information has occurred.

6. The system of claim 5, wherein the path is a path between a server and a client.

7. The system of claim 5, wherein means for performing a security check comprises means for performing an authentication check on the path.

8. The system of claim 5, wherein means for performing a security check comprises means for performing an authorization check on a user attempting to access the path.

9. The system of claim 5, wherein means for performing a security check comprises means for performing an authentication check on the path and means for performing an authorization check on a user attempting to access the path.

10. An apparatus for securing information on a network, comprising:
    a processor of a path sealer coupled with the network;
    instructions, operable on by the processor, for obtaining a path to the source of said information; and
    instructions, operable on by the processor, for performing a security check regarding the path to said source of said information so as to confirm that no tampering with said information has occurred.

11. The apparatus of claim 10, wherein the path is a path between a server and a client.

12. The apparatus of claim 10, wherein the instructions for performing a security check comprise instructions for performing an authentication check on the path.

13. The apparatus of claim 10, wherein the instructions for performing a security check comprise instructions for performing an authorization check on a user attempting to access the path.

14. The apparatus of claim 10, wherein the instructions for performing a security check comprise instructions for performing an authentication check on the path and instructions for performing an authorization check on a user attempting to access the path.

15. An apparatus for securing information on a network, comprising:
    a processor of a path sealer coupled with the network;
    wherein the processor is operable on instructions for obtaining a path to the source of said information; and
    wherein the processor is operable on instructions for performing a security check regarding the path to said source of said information to confirm that no tampering with said information has occurred.

16. The apparatus of claim 15, wherein the path is a path between a server and a client.

17. The apparatus of claim 15, wherein the processor comprises a processor operable on instructions for performing an authentication check on the path.

18. The apparatus of claim 15, wherein the processor comprises a processor operable on instructions for performing an authorization check on a user attempting to access the path.

19. The apparatus of claim 15, wherein the processor comprises a processor operable on instructions for performing an authentication check on the path and performing an authorization check on a user attempting to access the path.

20. A computer-readable media for securing information, the computer-readable media comprising:
    instructions for obtaining a path to the source of said information;
    instructions for storing said path in a path sealer;
    instructions for performing a security check regarding the path to said source of said information to confirm that no tampering with said information has occurred.

21. The computer-readable media of claim 20, wherein the path is a path between a server and a client.

22. The computer-readable media of claim 20, wherein instructions for performing a security check comprise instructions for performing an authentication check on the path.

23. The computer-readable media claim of claim 20, wherein instructions for performing a security check comprise instructions for performing an authorization check on a user attempting to access the path.

24. The computer-readable media of claim 20, instructions for performing a security check comprise instructions for performing an authentication check on the path and instructions for performing an authorization check on a user attempting to access the path.

25. A system for securing information, comprising:
    a server configured to provide the information;
    a path sealer coupled with the server, the path sealer configured to convey at least one entitlement criterion to an end user and configured to convey the information to an end user; and
    an access controller coupled with the path sealer, the access controller configured to convey at least one entitlement criterion to the path sealer and configured to convey at least one entitlement permission to an end user.

26. The system of claim 25, wherein the path is a path between a server and a client.

* * * * *